United States Patent
Anello et al.

[15] 3,697,564
[45] Oct. 10, 1972

[54] FLUOROCARBON ACIDS AND DERIVATIVES

[72] Inventors: Louis Gene Anello, Basking Ridge; Richard Francis Sweeney, Randolph Township, Morris County, both of N.J.; Morton Herbert Litt, Cleveland, Ohio

[73] Assignee: Allied Chemical Corporation, New York, N.Y.

[22] Filed: April 12, 1968

[21] Appl. No.: 721,115

Related U.S. Application Data

[63] Continuation-in-part of Ser. No. 633,359, April 25, 1967, Pat. No. 3,514,487.

[52] U.S. Cl. ................260/408, 252/356, 260/404, 260/464, 260/465.6, 260/468 R, 260/484 R, 260/514 R, 260/535 H, 260/544 L, 260/544 F, 260/544 Y, 260/557 R, 260/561 HL, 260/611 R, 260/614 F
[51] Int. Cl. .............................................C07c 59/22
[58] Field of Search ....................260/535 H, 413, 408

[56] References Cited

UNITED STATES PATENTS

| | | | |
|---|---|---|---|
| 3,231,604 | 1/1966 | Brace | 260/484 |
| 3,250,806 | 5/1966 | Warnell | 260/535 |
| 2,713,593 | 7/1955 | Brice et al. | 260/535 H X |
| 3,274,239 | 9/1966 | Selman | 260/535 H X |
| 3,342,874 | 9/1967 | Taylor | 260/535 H X |
| 3,409,647 | 11/1968 | Pittman et al. | 260/535 H X |

*Primary Examiner*—Lorraine A. Weinberger
*Assistant Examiner*— Paul J. Killos
*Attorney*—Jay P. Friedenson

[57] ABSTRACT

Fluorocarbon compounds of the formula

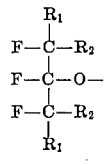

wherein $R_1$ and $R_2$ are F, fluoroalkyl or fluoroalkylene groups forming a cycloaliphatic structure, wherein $-(CZ_1Z_2-CZ_3Z_4)-$ and $-(CX_1X_2-CX_3X_4)-$ are bifunctional groups wherein $Z_1-Z_4$ and $X_1-X_4$ are H, F, or Cl, and wherein Y is $-CN$ or

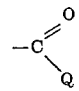

wherein Q represents F, Cl, hydroxy, alkoxy, amino or substituted amino groups are prepared from polyfluorohalides of the formula

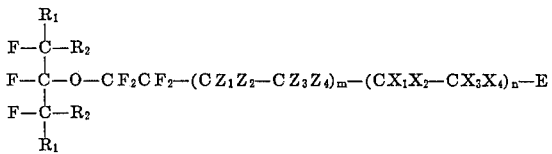

wherein E is a halogen.

Carboxylic acids of the present invention and their amides are oil and stain repellent agents. Their salts, esters, halides and nitriles are surfactants and/or intermediates for the preparation of oil and stain repellent agents.

17 Claims, No Drawings

FLUOROCARBON ACIDS AND DERIVATIVES

CROSS-REFERENCES TO RELATED APPLICATIONS

This application is a continuation-in-part of our copending application Ser. No. 633,359, now U.S. Pat. No. 3,514,487, filed Apr. 25, 1967, entitled "Telomers and Process for the Preparation Thereof."

Other related applications are:

1. Copending application of Litt et al., entitled "-Fluorinated Ethers," Ser. No. 492,276, now U.S. Pat. No. 3,453,333 filed Oct. 1, 1965.
2. Copending application of Litt et al., entitled "-Fluorinated Ether," Ser. No. 513,574, now U.S. Pat. No. 3,470,256, filed Dec. 13, 1965.
3. Copending application of Anello et al., entitled "-Terminally Unsaturated Fluoroolefins," filed of even date herewith.

BACKGROUND OF THE INVENTION

This invention relates to novel fluorocarbon acids characterized by a terminal fluoroisoalkoxy alkyl group and to their salts, halides, nitriles, alkyl esters and amides.

It is known that fluorocarbon acids and certain of their derivatives, such as their salts and esters, effectively lower the surface tension of water. It is also known that fluorocarbon acids and certain of their derivatives, such as the amides, are valuable oil and stain repellent agents by virtue of the presence of a reactive group at one end of the molecule, and the presence of a fluorocarbon "tail" having extremely low surface energy at the other end thereof. When the reactive groups of these acids are absorbed on or bonded to a solid surface, the fluorocarbon "tail" protrudes to form a fluorocarbon film having no affinity for either oil or water. We have found a novel class of fluorocarbon acids which have a highly fluorinated terminal branched-chain or cyclic fluoroalkoxy group linked through the ether oxygen to a $-CF_2CF_2-$ group which are oil, stain, and water repellent agents of unusual activity, and which can be converted into other oil, stain and water repellent agents of unusual activity.

One object of the present invention is the provision of novel fluorocarbon acids.

Another object is the provision of derivatives of these novel fluorocarbon acids.

A further object is the provision of novel fluorocarbon acids and their derivatives having surfactant and oil, stain and water repellent properties.

A still further object of the invention is the provision of novel fluorocarbon acids and their derivatives which can be employed to prepare superior surfactants and superior oil, stain, and water repellent compositions.

SUMMARY OF THE INVENTION

The novel fluorocarbon compounds of the present invention conform to the general formula

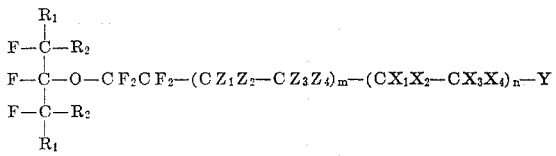

(I)

wherein a. $R_1$ and $R_2$ are F or fluoroalkyl groups or, when taken together, are fluoroalkylene groups forming a cycloaliphatic structure, which $R_1$ and $R_2$ groups may each have from one to nine carbon atoms, with the proviso that not more than three of the $R_1$ and $R_2$ groups may be fluoroalkyl groups, b. $-(CZ_1Z_2-CZ_3Z_4)-$ is a bifunctional group wherein $Z_1$, $Z_2$, $Z_3$ and $Z_4$ are independently selected from the group consisting of H, F and Cl, provided $Z_1-Z_4$ do not include more than two chlorine atoms, c. $-(CX_1X_2-CX_3X_4)-$ is a bifunctional group wherein $X_1$, $X_2$, $X_3$ and $X_4$ are independently selected from the group consisting of H, F and Cl, provided $X_1-X_4$ do not include more than one chlorine atom.

d. Y is a member selected from the group consisting of radicals of the formulas $-CN$ and

wherein Q is a substituent selected from the group consisting of i. $-OA$, wherein A is selected from the group consisting of hydrogen and the alkali metals,
ii. hal, wherein hal is a halogen selected from the group consisting of F and Cl,
iii. $-O-C_qH_{2q+1}$, wherein $q$ is an integer from 1 to 6, and
iv. $-NHB$, wherein B is selected from the group consisting of H, $-C_qH_{2q+1}$, $-C_qH_{2q}-OH$ and $-C_qH_{2q}Cl$, wherein $q$ is an integer from 1 to 6, and e. $m$ and $n$ are each integers of from 0 to about 75, with the proviso that the sum of $m$ and $n$ is from 1 to about 75.

The novel compounds of this invention can be prepared by various hereinafter described methods from telomers having the general formula

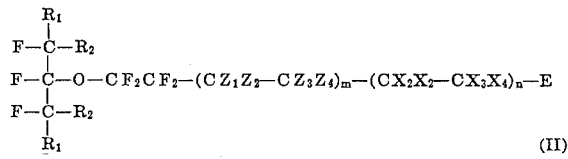

(II)

wherein $R_1$, $R_2$, $-(CZ_1Z_2-CZ_3Z_4)-$, $-(CX_1X_2-CX_3X_4)-$, $m$ and $n$ have the aforestated meanings, and wherein E is a halogen selected from the group consisting of Br and I. Telomers of that type and their preparation are described in detail in commonly assigned copending application of Anello et al. entitled, "-Telomers and Process for the Preparation Thereof," Ser. No. 633,359, now U.S. Pat. No. 3,514,487 filed Apr. 25, 1967, of which the present application is a continuation-in-part. By way of general description, these telomers are prepared by radical addition reactions of polyhaloisoalkoxyalkyl halide telogens of the formula

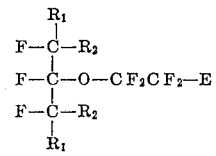

wherein $R_1$, $R_2$ and E have the aforestated meanings, with telomerizable unsaturated compounds. The telomerization reaction may be initiated by heat or by means of a free radical initiating catalyst. The polyhaloisoalkoxyalkyl halide telogen starting materials may be prepared by reacting a corresponding halogenated ketone with an ionizable fluoride salt, e.g. CsF, to form a fluorinated organic salt and then reacting the organic salt with a halogen other than fluorine and an olefin. Preparation of the telogen starting materials is described in detail in copending applications of Litt et al., "Fluorinated Ethers," U.S. Ser. Nos. 492,276 now U.S. Pat. No. 3,453,333 and 513,574 now U.S. Pat. No. 3,470,259, filed Oct. 1, 1965, and Dec. 13, 1965 respectively, the pertinent subject matter of which applications is hereby incorporated by reference.

The criticality in the molecule of the novel compounds of the present invention is in the structure of the fluoroisoalkoxyalkyl portion of the molecule. This portion of the molecule is critically characterized by the presence of an oxygen atom simultaneously linked to (a) a carbon atom linked to a fluorine atom as well as to two fluoroalkyl groups, and (b) a $-CF_2-CF_2-$ group. The fluoroalkyl groups are characterized by the presence of at least one fluorine atom on each carbon atom adjacent to the carbon atom linked to the oxygen atom. The fluoroalkyl groups may, when taken together, form a cycloaliphatic structure.

Fluorocarbon acids of this invention wherein $X_3$ and $X_4$ are both F may be prepared by reacting the corresponding telomer halides represented by general formula (II) above with ICN or $(CN)_2$ to form the nitrile, followed by hydrolysis of the nitrile to form the free acid. The reaction between the telomer halide and the ICN or $(CN)_2$ to form the nitrile is carried out under superatmospheric pressure above about 20 to 200 atmospheres or more at temperatures in excess of about 300°C., preferably between about 350° to 400°C. Reactant molar ratios are not critical although, for the purpose of optimizing yield of desired nitrile product, it is preferred to employ an excess of the ICN or $(CN)_2$ reactant. Hydrolysis of the nitrile to form the free acid can be effected by treatment with aqueous mineral acid, such as hydrochloric, phosphoric or sulfuric acid, at temperatures between about 60° and about 125°C., preferably between about 90°C. and about 110°C. Alternately, the nitrile may be hydrolyzed with aqueous alkali, such as NaOH or KOH, at temperatures between about 90°C. and about 110°C. to form the alkali metal salt of the acid, from which the free acid may be obtained by treatment with strong mineral acid, such as hydrochloric, phosphoric, or sulfuric acid. The acid salts exhibit unusually high surface active properties and may be used in the manner in which surfactants are conventionally employed, as in the preparation of emulsions and surface coatings and to increase wettability such as in the dyeing of textile fabrics.

Fluorocarbon acids of this invention wherein $X_3$ and $X_4$ are selected from the group consisting of H and F may be prepared by Grignard reaction in known manner by first converting a corresponding telomer halide to the Grignard reagent, reacting the Grignard reagent with carbon dioxide to form the carboxylate, and then hydrolyzing the carboxylate to obtain the desired acid.

The preparation of the Grignard reagent follows conventional methods, as for example, addition of magnesium turnings to a solution of the telomer halide in a suitable solvent such as ether or tetrahydrofuran. Since the Grignard reagent is destroyed by water, and since further the Grignard reagents of compounds wherein $X_3$ and $X_4$ and F are instable at ordinary temperatures, the preparation of the Grignard reagent and the following reaction thereof with carbon dioxide are conducted under careful exclusion of water and, when $X_3$ and $X_4$ and F, at temperatures below about 0°C., preferably below about −20°C. The Grignard reagent is reacted with carbon dioxide to form the corresponding carboxylate. This latter reaction may be conducted in any known manner, as e.g., by bubbling carbon dioxide gas into the Grignard reagent solution, by adding carbon dioxide snow or Dry-Ice to the Grignard reagent solution, by pouring or dropping the Grignard reagent solution onto solid carbon dioxide, and others. The desired acid is then obtained from the carboxylate by hydrolysis, as e.g., by drowning the carboxylate solution in water or weak mineral acid. The acid so produced may be recovered from the organic layer by evaporation of the solvent. Small amounts of the desired acid may also be recovered from the aqueous phase by extraction with a suitable solvent.

Fluorocarbon acids of this invention wherein $X_3$ and $X_4$ are both H may be prepared by reacting the corresponding telomer halides represented by formula (II) above with an alkali metal cyanide to form the nitrile, followed by hydrolysis of the nitrile to form the free acid. The reaction between the telomer halide and the alkali metal cyanide is preferably carried out in aqueous alcoholic solution at temperatures between about 60°C. and about 100°C. Preferred alkali metal cyanides are potassium cyanide and sodium cyanide. From the nitriles produced thus the free acids, or their alkali metal salts, can be obtained by hydrolysis as described above.

Fluorocarbon acids of this invention wherein $X_3$ and $X_4$ include a chlorine atom may be prepared by oxidation of the terminal ethylenically unsaturated group of fluoro-olefins having the formula

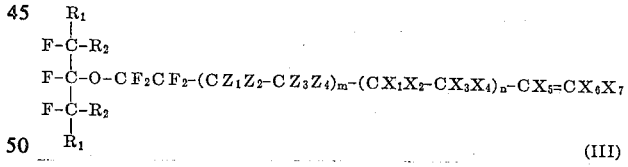

(III)

wherein $R_1$, $R_2$, $-(CZ_1Z_2-CZ_3Z_4)-$, $-(CX_1X_2-CX_3X_4)-$, m and n have the aforestated meanings, and $X_5$, $X_6$ and $X_7$ are independently H, F, or Cl. Oxidation of the terminal group may be conventionally effected by treatment with oxidizing agents such as potassium permanganate or dichromate. The fluoroolefins of the formula (III) above may be prepared from telomer halides of formula (II) above by methods effecting simultaneous removal of one substituent each from each of the carbon atoms of the terminal $-(CX_1X_2-CX_3X_4)E$ group, as e.g., by conventional dehalogenation or dehydrohalogenation. Preparation of these fluoroolefins is described in detail in our commonly assigned copending application Ser. No. 721,113, now U.S. Pat. No. 3,577,465 filed of even date herewith, entitled "Terminally Unsaturated Fluoroolefins," the pertinent subject matter of which is hereby incorporated by reference. Oxidation of the terminally unsaturated fluoroolefins to the corresponding fluorocarbon acid using potassium permanganate as oxidizing agent is suitably accomplished by heating a fluoro-olefin with potassium permanganate in a caustic medium, such as aqueous potassium or sodium hydroxide, to temperatures between about 50°C. and about 110°C., followed by acidification of the reaction medium with a mineral acid, such as hydrochloric acid or sulfuric acid, to liberate the free acid. Oxidation of the terminally unsaturated fluoroolefins to the corresponding fluorocarbon acids with potassium dichromate as oxidizing agent is suitably accomplished by heating a fluoro-olefin with potassium dichromate in an acidic medium, such as strong sulfuric or phosphoric acid, to temperatures between about 50°C. and about 110°C.

Alkyl esters of acids of the present invention having the formula (I) above wherein Y is

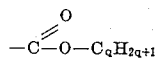

wherein $q$ has the aforestated meaning may be prepared by esterification of the acids with the corresponding alkyl alcohols, or, alternately, by esterification of the corresponding nitriles. These esterification reactions are conventional and may optionally be conducted in the presence of an esterification catalyst. The alkyl esters have surface active properties.

Hydrolysis of the alkyl esters or neutralization of the free acids with alkali metal hydroxides yields the alkali metal salts of the acids of the present invention. The salts react with mineral acids to form the corresponding fluorocarbon acids.

Amides of the acids of the present invention which have the formula (I) above wherein Y is

wherein X represents $-NH_2$, $-NH-C_qH_{2q+1}$, and $-NH-C_qH_{2q}-OH$ wherein $q$ has the meaning given above may be prepared in conventional manner by reacting the corresponding alkyl ester with ammonia or the corresponding primary alkyl or hydroxyalkyl amine. Amides of acids of the present invention wherein the bifunctional group $-(CX_1X_2-CX_3X_4)-$ is $-CH_2-CH_2-$ are preferably prepared by reacting the corresponding acid chloride with ammonia or the corresponding primary alkyl or hydroxyalkyl amine.

Substituted amides of the present invention which have the formula (I) above wherein Y is

wherein X represents $-NHC_qH_{2q}Cl$ wherein $q$ has the meaning given above may be prepared from the corresponding hydroxyamides by treatment with thionyl chloride, preferably at temperatures between about 50°C. and about 110°C. The reaction proceeds in the presence or absence of a solvent. Those substituted amides represented by formula (I) above wherein Y is

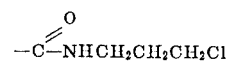

may also be prepared by reacting the corresponding acid chloride wherein Y is

with ethylenimine, preferably in the presence of an inert solvent, such as ethyl ether. The reaction proceeds readily at room temperature; elevated temperatures may be employed if desired. The amides and substituted amides of the present invention are oil, stain and water repellent agents of unusual activity.

The acid halides of the present invention represented by formula (I) above wherein Y is

may be prepared in conventional manner by reacting the corresponding carboxylic acid wherein Y is

with thionyl chloride, preferably in the presence of an inert organic solvent, such as chloroform. The acid halides of the present invention wherein Y is

may be prepared in known manner by reacting the corresponding acid chloride with potassium fluoride in the presence of a polar solvent such as acetonitrile or dimethylformamide. The reactions proceed readily at room temperature; elevated temperatures may be employed, if desired.

The nitriles of the present invention may also be prepared from the fluorocarbon acids of this invention by first forming the ester, converting the ester to the amide, and subsequently dehydrating the amide, using $P_2O_5$, to the nitrile.

The herein described methods for making the invention compounds starting with telomer halides represented by formula (II) above are conventional and are not part of the instant invention.

Other methods for preparing the flurocarbon compounds of the present invention from the telomers of formula (II) above will readily occur to those skilled in the art.

DESCRIPTION OF THE PREFERRED EMBODIMENT

With reference to formula (I) above for the novel fluorocarbon compounds of the present invention, $R_1$ and $R_2$ are preferably F or perfluoroalkyl groups. When perfluoroalkyl groups, $R_1$ and $R_2$ preferably contain one to two carbon atoms. When the $R_1$ and $R_2$ groups contain hydrogen substitution, the atomic ratio of fluorine to hydrogen is at least 1:1.

Specific examples of preferred embodiments of the

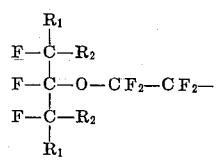

moiety in Formula I include the following:

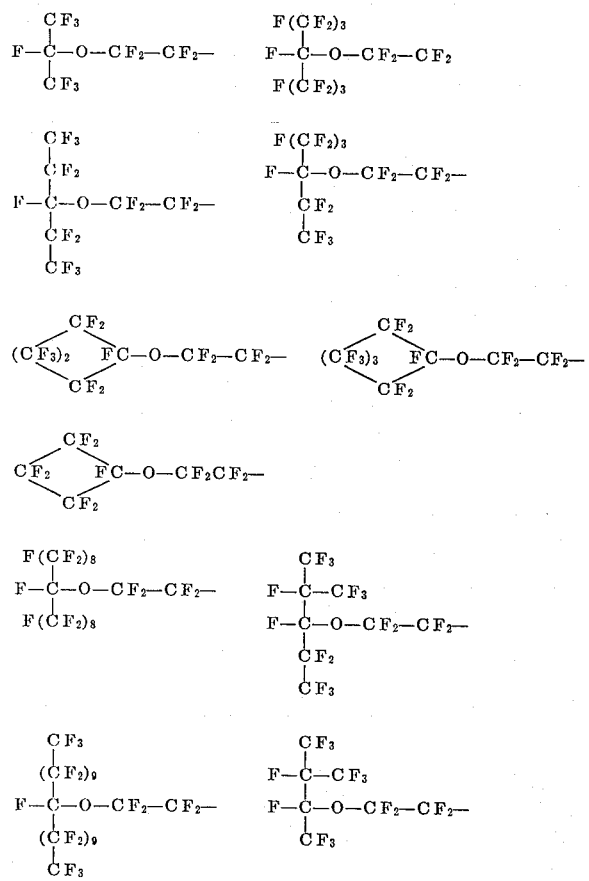

Preferred embodiments of the bifunctional group —$(CZ_1Z_2-CZ_3Z_4)$— of formula (I) above are represented by the groups —$CF_2$—$CF_2$, —$CH_2$—$CF_2$—, —$CF_2$—$CFCl$—, and —$CH_2$—$CH_2$— the group —$CF_2$—$CF_2$ being most preferred.

Preferred embodiments of the bifunctional group —$(CX_1X_2-CX_3X_4)$— of formula (I) above are represented by the groups —$CF_2$—$CF_2$—, —$CH_2$—$CF_2$—, and —$CH_2$—$CH_2$—, the group —$CH_2$—$CH_2$— being the most preferred.

Preferred specific embodiments of the present invention are fluorocarbon compounds according to formula (I) above having the formula

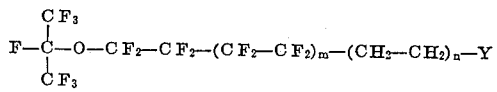

wherein Y has the meaning given above and wherein the sum of $m$ and $n$ is from 1 to about 20, still preferably from 1 to about 10.

The following Examples illustrate preparation of representative compounds of the present invention, but are not intended to be a limitation thereon.

EXAMPLE I

Preparation of $(CF_3)_2CFO$—$CF_2CF_2$—$(CF_2CF_2)_2$—$CH$=$CH_2$ by Dehydrohalogenation of $(CF_3)_2CFO$—$CF_2CF_2$—$(CF_2CF_2)_2$—$CH_2CH_2I$ Into a 250 ml 3-necked flask were placed 50 g. of absolute methanol and 8.75 g. (0.156 mol) of KOH pellets. To this mixture was slowly added 50 g. (0.078 mol) $(CF_3)_2CFO$—$CF_2CF_2$—$(CF_2CF_2)_2$—$CH_2CH_2I$. The temperature of the reaction mixture rose spontaneously to 45°C. The mixture was then heated to 80°C. and was kept at this temperature for a period of 4 hours. Thereafter the reaction mixture was cooled to room temperature, washed twice with water, aqueous and organic layers were separated, and the organic layer was dried over sodium sulfate, and was fractionally distilled under reduced pressure. There was thus recovered as distillate a main fraction of 36.5 g. (0.071 mol) of $(CF_3)_2CFO$—$CF_2CF_2$—$(CF_2CF_2)$—$CH$=$CH_2$ boiling at 91°–93°C. at 75 mm Hg. in 91 percent yield.

Elemental analysis of the product compared with the calculated composition of $C_{11}F_{19}H_3O$ as follows:

|   | Found  | Calculated |
|---|--------|------------|
| C | 26.32% | 25.94%     |
| F | 71.84  | 71.41      |
| H | 0.55   | 0.49       |

The assigned structure was confirmed by infrared analysis which showed a C=C absorption band at 6.1 micron.

EXAMPLE II

Preparation of $(CF_3)_2CFO$—$CF_2CF_2$—$CF_2CF_2$—$CCl$=$CF_2$ by Dehalogenation of $(CF_3)_2CFO$—$CF_2CF_2$—$CF_2CF_2$—$CCl_2CF_2I$ Into a 500 ml flask is placed 200 g. of anhydrous ethanol and 65 g. (1.0 mol) of powdered zinc. The slurry is heated to about 50°C. while 150 g. (0.23 mol) of $(CF_3)_2CFO$—$CF_2CF_2$—$CF_2CF_2$—$CCl_2$—$CF_2I$ is slowly added. This mixture is then maintained at a temperature of 65°C. for a period of 5 hours, and thereafter is allowed to cool to about room temperature. It is then filtered to remove unreacted zinc and undissolved zinc salts, is washed twice with water, dried over anhydrous magnesium sulfate, and is then subjected to fractional distillation. About 70 percent of the starting material is converted to and recovered as $(CF_3)_2CFO$—$CF_2CF_2$—$CF_2CF_2$—$CCl$=$CF_2$.

EXAMPLE III

Preparation of $(CF_3)_2CFO$—$CF_2CF_2$—$(CF_2CF_2)_2$—$COOH$

Into a 500 ml flask equipped with thermometer, stirrer and dropping funnel are placed 50.5 g. (0.32 mol) potassium permanganate, 10.5 g. (0.16 mol) of 85 percent potassium hydroxide pellets and 200 ml water.

The mixture is heated with stirring to 100°C. and 82 g. (0.16 mol) of $(CF_3)_2CFO-CF_2CF_2-(CF_2CF_2)_2-CH=CH_2$, the product of Example I, are slowly added. The temperature is then maintained at about 65°C. for a period of about 2½ hours, after which time the reaction mixture is neutralized by addition of aqueous sulfuric acid. The mixture so neutralized is filtered to remove $MnO_2$, aqueous and organic layers are separated, the organic layer is dried over anhydrous sodium sulfate, and is then fractionally distilled at about 110°–112°C. at 25 mm Hg. There is obtained as main fraction the product $(CF_3)_2CFO-CF_2CF_2-(CF_2CF_2)_2-COOH$.

EXAMPLE IV

Preparation of $(CF_3)_2CFO-CF_2CF_2-CF_2CF_2-COOH$

When $(CF_3)_2CFO-CF_2CF_2-CF_2CF_2-CCl=CF_2$, the product of which Example II, is oxidized in accordance with the method of Example III, there is obtained as product the compound $(CF_3)_2CFO-CF_2CF_2-CF_2CF_2-COOH$.

EXAMPLE V

Preparation of $(CF_3)_2CFO-CF_2CF_2-CH_2CH_2CN$

Into a 100 ml 3-necked flask were placed 50 ml dimethyl sulfoxide and 15 g. (0.306 mol) NaCN. The mixture was heated to 60°C. and 53 g. (0.12 mol) of $(CF_3)_2CFO-CF_2CF_2-CH_2CH_2I$ was rapidly added, causing the temperature to rise to 85°C. The mixture was then cooled to 25°C. and was washed with water. The water-insoluble oil was separated, dried over sodium sulfate and distilled under reduced pressure. There were recovered 3 g. (0.007 mol) of starting material, and 29 g. (0.086 mol) of $(CF_3)_2CFO-CF_2CF_2-CH_2CH_2CN$, b.p. 68°–69°C./10 mm Hg.

Infrared spectrographic analysis of the product showed a nitrile absorption band at 4.42 microns.

Elemental analysis of the product compared with the calculated composition of $C_8F_{11}H_4NO$ as follows:

|   | Found  | Calculated |
|---|--------|------------|
| C | 27.92% | 28.37%     |
| F | 62.20  | 61.65      |
| H | 1.08   | 1.18       |
| N | 4.10   | 4.13       |

EXAMPLE VI

Preparation of $(CF_3)_2CFO-CF_2CF_2-CF_2CF_2CH_2CH_2-CN$

Into a 200 ml. 3-necked flask were placed 100 ml. (117 g.) dimethyl sulfoxide and 18.5 g. (0.376 mol) NaCN. The mixture was heated to 60°C. and 109 g. (0.202 mol) of $(CF_3)_2CFO-CF_2CF_2-CF_2CF_2-CH_2CH_2I$ was slowly added. The temperature was maintained at 80°C. for 5 hours. The mixture became viscous and heating was stopped. After cooling to about room temperature, the product was washed with water and the water-insoluble oil was separated, dried over sodium sulfate and distilled under reduced pressure. There were recovered 23.5 g. (0.0453 mol) of $(CF_3)_2CFO-CF_2CF_2-CF_2CF_2-CH_2CH_2I$, b.p. 30°–31C/15 mm Hg. and 54.5 g. (0.124 mol) of $(CF_3)_2CFO-CF_2CF_2-CF_2CF_2-CH_2CH_2CN$, b.p. 99°–100bLC/15 mm Hg.

Infrared spectrographic analysis showed a nitrile absorption band at 4.42 microns.

Elemental analysis of the product compared with the calculated composition of $C_{10}F_{15}H_4NO$ as follows:

|   | Found  | Calculated |
|---|--------|------------|
| C | 27.25% | 27.33%     |
| F | 65.02  | 64.82      |
| H | 0.85   | 0.91       |
| N | 3.45   | 3.19       |

EXAMPLE VII

Preparation of $(CF_3)_2CFO-CF_2CF_2-(CF_2CF_2)_2-CH_2CH_2-CN$

Into a 250 ml 3-necked flask were placed 75 ml dimethyl sulfoxide and 17.2 g. (0.35 mol) NaCN. The mixture was heated to 60°C. and 75 g. (0.117 mol) $(CF_3)_2CFOC-CF_2CF_2-(CF_2CF_2)_2-CH_2CH_2I$ was added at a rate to maintain the temperature below 80°C. Reaction time was about 1 hour. The mixture was washed with water and the water-insoluble oil was separated, dried over sodium sulfate and distilled under reduced pressure. There were recovered 23.5 g. (0.037 mol) of $(CF_3)_2CFO-CF_2CF_2-(CF_2CF_2)_2-CH_2CH_2I$, b.p. 60°–64°C./1 mm Hg. and 38.5 g. (0.072 mol) of $(CF_3)_2CFO-CF_2CF_2-(CF_2CF_2)_2-CH_2CH_2CN$, b.p. 81°–82C./1 mm Hg.

Elemental analysis of the product compared with the calculated composition of $C_{12}F_{19}H_4NO$ as follows:

|   | Found  | Calculated |
|---|--------|------------|
| C | 27.02% | 26.72%     |
| F | 67.00  | 66.97      |
| H | 0.82   | 0.74       |
| N | 2.72   | 2.60       |

EXAMPLE VIII

Preparation of $(CF_3)_2CFO-CF_2CF_2-CF_2CF_2-CN$

Equimolar amounts of $(CF_3)_2CFO-CF_2CF_2-CF_2CF_2I$ and cyanogen iodide are sealed in a glass tube and are heated to 350°C. for a period of 5 hours. The reaction products are cooled, removed from the glass tube, and subjected to fractional distillation. There is recovered as main fraction the product $(CF_3)_2CFO-CF_2CF_2-CF_2CF_2-CN$. The compound $[(CF_3)_2CFO-CF_2CF_2-CF_2CF_2]_2$ is formed as a by-product of the reaction.

EXAMPLE IX

Preparation of $(CF_3)_2CFO-CF_2CF_2-(CF_2CF_2-CN$

Equimolar amounts of $(CF_3)_2CFO-CF_2CF_2-(CF_2CF_2)_2I$ and cyanogen are sealed in a glass ampule in amount calculated to provide autogenous pressure of about 100 atmospheres at about 350°C. The ampule is brought to temperature of 350°C. and is maintained at that temperature for about 1 hour. Thereafter the reaction mixture is allowed to cool to room temperature, and is subjected to fractional distillation under reduced pressure. There is obtained a fraction of $[(CF_3)_2CFO-CF_2CF_2-CF_2CF_2-CF_2CF_2]_2$ and a fraction of the desired product $(CF_3)_2CFO-CF_2CF_2-(CF_2CF_2)_2CN$.

EXAMPLE X

Preparation of $(CF_3)_2CFO-CF_2CF_2-CH_2CH_2-COOH$

Into a 200 ml 3-necked flask were placed 60 g. 35% HCl and 30 g. (0.089 mol) $(CF_3)_2CFO-CF_2CF_2-CH_2CH_2-CN$. The mixture was heated to 100°C. for 5 hours. After that 5 hour period the mixture was allowed to cool to room temperature, was washed with water, aqueous and organic phases were separated, the organic phase was dried over sodium sulfate and was distilled under reduced pressure. There was recovered 18.4 g. (0.54 mol) of $(CF_3)_2CFO-CF_2CF_2-CH_2CH_2-COOH$, b.p. 95°-96°C./5 mm Hg.

Infrared spectrographic analysis of the product showed a carboxyl band at 3.2 microns and a carbonyl band at 5.8 microns.

Elemental analysis of the product compared with the calculated composition of $C_8F_{11}H_5O_3$ as follows:

|   | Found | Calculated |
|---|-------|------------|
| C | 27.12% | 26.82% |
| F | 58.62 | 58.38 |
| H | 1.45 | 1.39 |

EXAMPLE XI

Preparation of $(CF_3)_2CFO-CF_2CF_2-CF_2CF_2-CH_2CH_2-COOH$

Into a 200 ml 3-necked flask were placed 48.5 g. (0.11 mol) $(CF_3)_2CFO-CF_2CF_2-CF_2CF_2CH_2CH_2CN$ and 75 ml 70% $H_2SO_4$. The mixture was heated to 110°-120°C. for 5 hours. The mixture was then cooled and aqueous and organic phases were separated. The aqueous phase was extracted with ether, and the organic phase and ethereal extract were combined, dried, and distilled under reduced pressure. There was recovered 44 g. (0.096 mol) of $(CF_3)_2CFO-CF_2CF_2-CF_2CF_2-CH_2CH_2-COOH$, b.p. 108°-110°C./4 mm Hg.

Elemental analysis of the product compared with the calculated composition of $C_{10}F_{15}H_5O_3$ as follows:

|   | Found | Calculated |
|---|-------|------------|
| C | 27.02% | 26.21% |
| F | 61.85 | 62.25 |
| H | 0.92 | 1.09 |

Infrared spectrographic analysis showed a carboxyl absorption at 3.2 to 3.4 microns and a carbonyl absorption at 5.8 microns.

EXAMPLE XII

Preparation of $(CF_3)_2CFO-CF_2CF_2-(CF_2CF_2)_2-CH_2CH_2-COOH$

Into a 200 ml 3-necked flask were placed 34.5 g. (0.064 mol) of $(CF_3)_2CFO-CF_2CF_2-(CF_2CF_2)_2-CH_2CH_2-CN$ and 60 g. of 70% $H_2SO_4$. The mixture was heated to 110°-120°C. for 5 hours. Thereafter the mixture was cooled and aqueous and organic phases were separated. The aqueous phase was extracted with ether, and organic phase and ethereal extract were combined, dried and distilled. There was recovered 32 g. (0.057 mol) of $(CF_3)_2CFO-CF_2CF_2-(CF_2CF_2)_2-CH_2CH_2-COOH$, b.p. 121°-123°C./3.9 mm Hg.

Infrared spectrographic analysis of the product showed the carbonyl absorption at 3.2 to 3.4 microns and a carboxyl absorption at 5.82 microns.

Elemental analysis of the product compared with calculated composition of $C_{12}F_{19}H_5O_3$ as follows:

|   | Found | Calculated |
|---|-------|------------|
| C | 26.12% | 25.99% |
| F | 65.24 | 64.70 |
| H | 1.02 | 0.90 |

EXAMPLE XIII

Preparation of $(CF_3)_2CFO-CF_2CF_2-(CF_2CF_2)_7-COONa$ and $(CF_3)_2CFO-CF_2CF_2-(CF_2CF_2)_7COOH$ When the nitrile $(CF_3)_2CFO-CF_2CF_2-(CF_2CF_2)_7-CN$ is hydrolyzed by heating with aqueous NaOH there is obtained the salt $(CF_3)_2CFO-CF_2CF_2-(CF_2CF_2)_7-COONa$. When this salt is treated with 70% $H_2SO_4$ there is obtained the free acid $(CF_3)_2CFO-CF_2CF_2-(CF_2CF_2)_7-COOH$.

EXAMPLE XIV

Preparation of $(CF_3)_2CFO-CF_2CF_2-(CF_2CF_2)_3-(CH_2CH_2)_7-COOH$ by Grignard Reaction Into a nitrogen-swept flask equipped with dry-ice condensor and magnetic stirrer are added 150 ml. anhydrous ethyl ether and 3.35 g. magnesium turnings. The flask is cooled with dry-ice and an additional 50 ml. portion of anhydrous ethyl ether is added under constant agitation of flask contents. To this cooled, agitated mixture is then added a solution of 90 g. $(CF_3)_2CFO-CF_2CF_2-(CF_2CF_2)_3-(CH_2CH_2)_7Br$ in 50 ml. ethyl ether. The resulting mixture is stirred for one-half hour, after which time an additional 100 ml. portion of ethyl ether is added thereto. The mixture is then allowed to warm to about 40°C. and carbon dioxide is bubbled therethrough at a rate of about 0.1 mol/hr. for a period of 2 hours. Thereafter stirring is continued for a period of about 16 hours at room temperature. The mixture is then cooled to 0°C. and a 400 ml portion of 24 percent aqueous sulfuric acid, precooled to 0°C., is added thereto under constant agitation. Aqueous and organic layers are separated, the aqueous layer is thrice extracted with ether, organic layer and ethereal extracts are combined, dried over sodium sulfate, and subjected to fraction distillation. The product thus obtained is $(CF_3)_2CFO-CF_2CF_2-(CF_2CF_2)B\%3-(CH_2CH_2)_7-COOH$.

EXAMPLE XV

Preparation of $(CF_3)_2CFO-CF_2CF_2-CH_2CH_2COOCH_3$

Into a 100 ml. 3-necked flask equipped with stirrer and reflux condenser were placed 50 g. absolute methanol and 15 g. (0.044 mol) $(CF_2)_2CFO-CF_2CF_2-CH_2CH_2CN$. The mixture was stirred and into this stirred mixture was bubbled 12.8 g. (0.33 mol) anhydrous HCl. A white solid was formed and the reaction temperature rose from 25°C. to 66°C. After addition of 5 g. (0.28 mol) of water the mixture was heated to reflux for 2 hours. After that 2 hour period another 10 g. (0.56 mol) portion of water was added and reflux was continued for an additional hour. The mixture was then cooled to room temperature, aqueous and organic phases were separated, the aqueous phase was thrice extracted with ether, organic phase and ethereal extracts were combined, dried over sodium sulfate and distilled under reduced pressure. There was recovered 8.7 g. (0.023 mol) of $(CF_3)_2CFO-CF_2CF_2-CH_2CH_2-CO_2CH_3$, b.p. 59°C./10 mm Hg.

Infrared spectrographic analysis of the product showed a carbonyl band at 5.8 microns.

Elemental analysis of the product compared with the calculated composition of $C_9F_{11}H_7O$ as follows:

|   | Found | Calculated |
|---|-------|------------|
| C | 30.01% | 29.02% |
| F | 56.62 | 56.18 |
| H | 2.02 | 1.88 |

EXAMPLE XVI

Preparation of $(CF_3)_2CFO-CF_2CF_2-CH_2CH_2-CO_2C_2H_5$

To a flask equipped with a reflux condenser are added 195 g. of $(CF_3)_2CFO-CF_2CF_2-CH_2CH_2-COOH$, 75 g. of ethanol, 2 g. of p-toluene sulfonic acid (serving as a catalyst) and 400 ml. benzene as a solvent. The mixture is heated to reflux for 6 hours using a water entrainment trap. The water formed in the esterification is collected and the benzene returned to the reaction mixture, slightly more than the theoretical amount of water being recovered. The mixture is then cooled, filtered, and the benzene is removed by distillation. The crude product is dissolved in ether, is washed in aqueous potassium hydroxide and twice with water. The ether solution is dried and redistilled. The recovered product is identified as the expected ester $(CF_3)_2CFO-CF_2CF_2-CH_2CH_2-CO_2C_2H_5$.

EXAMPLE XVII

Preparation of $(CF_3)_2CFO-CF_2CF_2-(CF_2CF_2)_4-(CH_2CH_2)_6-COOC_6H_{13}$

Following the procedure set forth in Example XVI there is reacted the acid $(CF_3)_2CFO-CF_2CF_2-(CF_2CF_2)_4-(CH_2CH_2)_6-COOH$ with the alcohol $C_6H_{13}OH$, to obtain as product the ester $(CF_3)_2CFO-CF_2CF_2-(CF_2CF_2)_4-(CH_2CH_2)_6-COOC_6H_{13}$.

EXAMPLE XVIII

Preparation of $(CF_3)_2CFO-CF_2CF_2-(CH_2CH_2)_5COOH$ by Hydrolysis of $(CF_3)_2CFO-CF_2CF_2-(CH_2CH_2)_5COOCH_3$ To a solution of 35 g. KOH in 350 ml. water was added 180 g. $(CF_3)_2CFO-CF_2CF_2-(CH_2CH_2)_5COOCH_3$, and the mixture was heated to 100°C. for a period of 1½ hours. After about 20 minutes at 100°C. the mixture began to foam copiously. After the 1½ hour period the mixture was cooled to room temperature and was acidified with sulfuric acid. The desired acid separated out as a white, waxy solid, which was recovered from the reaction mixture by filtration. There was thus obtained 175 g. of the free acid in 90 percent yield. The product, upon recrystallization from $CHCl_3$, had a melting point of 30°–32°C., and a refractive index $n_D^{30°} = 1.3672$. The infrared spectrum of the purified product was compatible with assigned structure.

EXAMPLE XIX

Preparation of $(CF_3)_2CFO-CF_2CF_2-(CF_2CF_2)_2-CONH_2$ 18.5 g. (about 0.036 mol) of $(CF_3)_2CFO-CF_2CF_2-(CF_2CF_2)_2COOH_3$ is dissolved in 50 ml of ethyl ether. Under constant stirring the solution is cooled to 0°C. and a stream of gaseous ammonia is slowly bubbled into the stirred solution until it is saturated. The mixture is then heated to about 70°C. to evaporate volatiles. There is obtained about 18 g. of $(CF_3)_2CFO-CF_2CF_2-(CF_2CF_2)_2-CONH_2$, which is a slightly waxy, white product, soluble in benzene and petroleum ether.

The assigned structure is confirmed by infrared analysis showing the expected absorption bands at 2.95, 3.1, 5.9 and 6.2 microns corresponding to the amide function, and a band at 10.1 micron characteristic of the ether linkage in this type of compound.

EXAMPLE XX

Preparation of $(CF_3)_2CFO-CF_2CF_2-(CF_2CF_2)_6-CONH_2$

Following the general procedure outlined in Example XVIII about 20 g. (0.025 mol) of $(CF_3)_2CFO-CF_2CF_2-(CF_2CF_2)_6-COOCH_3$ is reacted with gaseous ammonia in 100 ml ether. After removal of volatiles there is obtained about 26 g. of $(CF_3)_2CFO-CF_2CF_2-(CF_2CF_2)_6-CONH_2$, which is a white product, not very soluble in benzene, carbon tetrachloride or petroleum ether but readily soluble in acetonitrile.

Infrared analysis of this product, after recrystallization from acetonitrile, shows the expected absorption bands at 2.85, 3.0, 5.8 and 6.1 microns corresponding to the amide function, and a band at approximately 10.15 micron characteristic of the ether linkage in this class of compounds, confirming assigned structure.

EXAMPLE XXI

Preparation of $(CF_3)_2CFO-CF_2CF_2-(CF_2CF_2)_5-CONHCH_2CH_2{}^{OH}_{2d}$

Five g. (about 0.0061 mol) of $(CF_3)_2CFO-CF_2CF_2-(CF_2CF_2)_5COOCH_3$ is reacted with 0.82 g. (0.013 mol) of 2-aminoethanol in 60 ml of ethyl ether at a temperature of about 200°C. for a period of 24 hours. The reaction mixture is then evaporated to dryness, is triturated with petroleum ether and is dried in vacuo to yield about 3.5 g. of crude $(CF_3)_2CRO-CF_2CF_2(CF_2CF_2)_5-CONHCH_2CH_2OH$ product, which can be recrystallized from petroleum ether.

Infrared analysis of the recrystallized product shows a band at approximately 3.0 micron corresponding to the O—H and N—H functions, amide bands at about 5.9 and 6.5 microns, bands at about 3.3 and 7.0 microns corresponding to C—H absorption, and the ether band at about 10.1 micron, confirming assigned structure.

EXAMPLE XXII

Preparation of $(CF_3)_2CFO-CF_2CF_2-(CF_2CF_2)_5CONHCH_2CH_2Cl$

Two grams of $(CF_3)_2CFO-CF_2CF_2-(CF_2CF_2)_5-CONHCH_2CH_{2d}OH$ are mixed with 0.48 g. thionyl chloride and the mixture is heated to a temperature of 85°–95C. for a period of 45 minutes. The mixture is then cooled, triturated with cold water, and filtered to separate the crude solid product. After drying the crude product in vacuo at 55°C. there are obtained about 1.7 g. of $(CF_3)_2CFO-CF_2CF_2-(CF_2CF_2)_5-CONHCH_2CH_{2d}Cl$, soluble in acetonitrile.

EXAMPLE XXIII

Preparations of $(CF_3)_2CFO-CF_2CF_2-(CF_2CF_2)_{10}-CONH(CH_2)_{6c}{}^{Cl}$

When $(CF_3)_2CFO-CF_2CF_2-(CF_2CF_2)_{10}-CONH(CH_2)_{6c}OH$ is reacted with thionyl chloride following the procedure of Example XXII there is obtained as product the compound $(CF_3)_2CFO-CF_2CF_2-(CF_2CF_2)_{10}-CONH(CH_2)_6Cl$.

EXAMPLE XXIV

Preparation of $(CF_3)_2CFO-CF_2CF_2-(CF_2CF_2)_5-(CH_2CH_2)_5-CONHC_6H_{13}$

To a solution of 30 g. of $(CF_3)_2CFO-CF_2CF_2-(CF_2CF_2)_5-(CH_2CH_2)_5-COCl$ in 75 ml. of ether is added a solution of 10 g. hexylamine in 20 ml. of ether over a period of 1 hour constant stirring of the reaction mixture. A white precipitate of hexylamine - hydrogen chloride is immediately formed. Stirring is continued at reflux temperature for 1 hour, after which time the product mixture is filtered and distilled to recover the amide $(CF_3)_2CFO-CF_2CF_2-(CF_2CF_2)_5-(CH_2CH_2)_5-CONHC_6H_{13}$ in good yield.

EXAMPLE XXV

Preparation of $(CF_3)_2CFO-CF_2CF_2-(CH_2CH_2)_5-CONHCH_2CH_{2d}Cl$

To a solution of 20 g. of $(CF_3)_2CFO-CF_2CF_2-(CH_2CH_2)_5-COCl$ in 60 ml ether was added a solution of 1.8 g. ethylenimine in 20 ml ether dropwise over period of 30 minutes with constant stirring of the reaction mixture. Stirring was continued for 1 hour after which time ether and excess ethylenimine was removed by flash evaporation to obtain 21 g. of the liquid product $(CF_3)_2CFO-CF_2CF_2-(CH_2CH_2)_5-CONHCH_2CH_{2d}Cl$ in quantitative yield.

EXAMPLE XXVI

Preparation of $(CF_3)_2CFO-CF_2CF_2-CH_2CH_2-CONH(CH_2)_3OH$ contents

A 250 ml flask equipped with stirrer and reflux condenser with water trap was charged with a solution of 36 g. $(CF_3)_2CFO-CF_2CF_2-CH_2CH_2-COOH$ in 50 ml of toluene. Flask contents were heated to 40°C. and 10 g. 3-aminopropanol was added dropwise. Upon completion of 3-aminopropanol addition flask contents were maintained at 80°C. for 1 hour, and were then refluxed for a period of 4 hours to remove water of reaction. There was considerable foaming, and about 4 ml of water collected in the trap. During reflux there was added to the reflux mixture an additional 5 g. of 3-aminopropanol. Upon completion of the 4 hour reflux period flask contents were allowed to cool, were then transferred to a distillation apparatus wherein toluene and excess 3-aminopropanol were distilled off under reduced pressure. There was thus obtained as residue 41 g. of the compound $(CF_3)_2CFO-CF_2CF_2-CH_2CH_2-CONH(CH_2)_3OH$, a light colored viscous oil.

EXAMPLE XXVII

Preparation of $(CF_3)_2CFO-CF_2CF_2-CH_2CH_2-COONa$

A 20 g. portion of the acid $(CF_3)_2CFO-CF_2CF_2-CH_2CH_2-COOH$ is dissolved in 20 ml of ethanol. To this solution is slowly added a 20 percent aqueous solution of sodium hydroxide until the solution attains a pH of about 7. The mixture is dried in an oven at 230°F. to yield about 20 g. of the white crystalline product $(CF_3)_2CFO-CF_2CF_2-CH_2CH_2-COONa$.

EXAMPLE XXVIII

Preparation of $(CF_3)_2CFO-CF_2CF_2-(CH_2CH_2)_5-COCl$

A solution of 38 g. $SOCl_2$ in 30 ml $CHCl_3$ was placed in a flask equipped with thermometer and reflux condenser. The solution was heated to about 50°C., and 130 g. of the acid $(CF_3)_2CFO-CF_2CF_2-(CH_2CH_2)_5-COOH$, dissolved in $CHCl_3$ was added dropwise to the flask over a period of 40 minutes. Flask contents were then heated to and maintained at reflux for a period of 40 minutes until gas evolution (HCl) had ceased. Flask contents were cooled, transferred to distillation apparatus, and were subjected to fractional distillation under reduced pressure of 0.1 mm Hg. There were obtained the following fractions:

| Fraction | b.p.°C. | $n_D^{23°}$ | g. | Remarks |
|---|---|---|---|---|
| 1 | 65–99 |  | 1 | discarded |
| 2 | 98–100 | 1.3760 | 3 | product |
| 3 | 100–102 | 1.3722 | 5 | " |
| 4 | 103–104 | 1.3715 | 3 | " |
| 5 | 104–106 | 1.3718 | 114 | " |
| 6 | 106–110 | 1.3735 | 4 | " |
| Residue |  |  | 6 | discarded |
|  | Total |  | 136 g. |  |

Thus, there were obtained 129 g. of the product $(CF_3)_2CFO-CF_2CF_2-(CH_2CH_2)-COCl$ in about 95 percent yield.

Elemental analysis of the product compared with calculated composition of $(CF_3)_2CFO-CF_2CF_2-(CH_2CH_2)-ClCl$ as follows:

|  | Calculated | Found |
|---|---|---|
| C | 40.5% | 39.3% |
| H | 4.1 | 4.1 |
| Cl | 7.3 | 7.3 |

Infrared spectrum of the product was compatible with assigned structure.

EXAMPLE XXIX

Preparation of $(CF_3)_2CFO-CF_2CF_2-(CF_2CF_2)_2-(CH_2CH_2)_8-COF$

The acid halide $(CF_3)_2CFO-CF_2CF_2-(CF_2CF_2)_2-(CH_2CH_2)_8COCl$ is added to a slurry of potassium fluoride in acetonitrile over a 30 minute period while stirring vigorously. The mixture is then heated to reflux (81°C.) for 1 hour, cooled, filtered and distilled to give the desired product $(CF_3)_2CFO-CF_2CF_2-(CF_2CF_2)_2-(CH_2CH_2)_8-COF$.

EXAMPLE XXX

This example illustrates the effect of the fluorinated salt $(CF_3)_2CFO-CF_2CF_2-(CH_2CH_2)_5-COONa$ on the surface tension of water as determined by measuring the surface tensions of a series of aqueous solutions with a tensiometer in accordance with ASTM Test D-1590. The results were as follows:

| Concentrations of Fluorinated Salt in Water (Wt. %) | Surface Tension (dynes/cm.) |
|---|---|
| 5.2 | 17.4 |
| 3.2 | 18.2 |
| 1.5 | 18.3 |
| 0.5 | 18.4 |
| 0.38 | 18.5 |
| 0.10 | 18.7 |
| 0.06 | 18.7 |
| 0.010 | 22.2 |
| 0.006 | 23.6 |
| 0 | 73.0 |

The alkali metal salts of the present invention have outstanding effect on the surface tension of water even under acidic conditions. Results of surface tension measurements of a series of aqueous solutions of $(CF_3)_2CFO-CF_2CF_2-(CH_2CH_2)_5-COONa$ containing various amounts of sulfuric acid are shown below:

| Concentration of Fluorinated Salt in Water (Wt. %) | Concentration of $H_2SO_4$ in Water (mol % based on the Fluorinated Salt) | pH of solution | Surface Tension (dynes/cm.) |
|---|---|---|---|
| 2.1 | 0 | 8 | 16.2 |
| 2.1 | 4.1 | 8 | 15.4 |
| 2.0 | 8.2 | 8 | 15.4 |
| 2.0 | 12.3 | 7.5 | 15.4 |
| 1.9 | 21 | 7 | 15.4 |
| 1.8 | 41 | 7 | 15.4 |
| 1.6 | 63 | 6 | 17.2 |
| 1.4 | 105 | 2 | 22.2 |

Preparative methods other than those hereinabove described may be employed to make the novel compounds of this invention. Preparation of the acids, esters, nitriles and amides of this invention from telogen starting materials having the formula

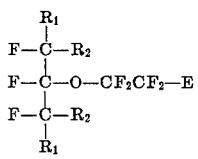

wherein $R_1$, $R_2$ and E have the aforestated meanings by telomerization reaction with appropriate telomerizable terminally ethylenically unsaturated compounds having a nitrile, carboxyl, amide or ester group in terminal position to form a corresponding iodine- or bromine-containing nitrile, acid, amide or ester, followed by replacement of the bromine or iodine with chlorine, fluorine or hydrogen to obtain the compounds claimed herein is described in our co-pending application Ser. No. 633,359, filed Apr. 25, 1967, of which this application is a continuation-in-part. Example XXXI below illustrates preparation of the ester $(CF_3)_2CFO-CF_2CF_2-CF_2CF_2-(CH_2CH_2)_5-COOCH_3$ by that procedure.

EXAMPLE XXXI

A 1 liter flask equipped with stirrer, thermometer and reflux condenser was charged with 198 g. (1 mol) of methyl undecenoate, 516 g. (1.01 mol) of heptafluoroisopropyl-4-iodooctafluorobutyl ether and 4.1 g. (0.025 mol) of azobisisobutyronitrile as catalyst. The mixture was warmed on a steam bath to 70°–80°C. whereupon an exothermic reaction was observed and some cooling was required to maintain the reaction temperature between about 70°–80°C. After 1 hour the reaction temperature was raised to 90°–95°C. for a period of 4 hours. Thereafter the flask was evacuated to 10 mm Hg. to remove unreacted iodoether (69 g.) by distillation. There was thus obtained a residue of 640 g. of crude iodoester $(CF_3)_2CFO-CF_2CF_2-CF_2CF_2-CH_2-CHI-(CH_2CH_2)_4COOCH_3$, containing some unreacted methyl undecenoate.

This 640 g. of crude iodoester was then added dropwise to a dispersion of 65 g. (1 mol) of zinc dust in 1.5 liters of acetic acid at 110°–115°C. contained in a 3 liter flask equipped with stirrer, thermometer, condenser and dropping funnel. After about half of the iodoester had been added, an additional 65 g. portion of zinc dust was added to the flask, followed by the remainder of the iodoester. Total time required for addition of the iodester was 1½ hours. After all of the iodoester was added to the acetic acid an additional 20 g. portion of zinc dust was added to the flask, and flask contents were maintained at reflux for a period of 5 hours. Flask contents were then drowned in 3 liters of water, aqueous and organic phases were separated, the aqueous phase was extracted with ether, organic phase and ethereal extracts were combined, washed with water, dried over anhydrous magnesium sulfate, and the ether was stripped off. Fractional distillation of the crude product gave a forecut of 31.5 g. of methylundecenoate, and a main fraction of $(CF_3)_2CFO-CF_2CF_2-CF_2CF_2-(CH_2CH_2)_5COOCH_3$, b.p. 148°–155°C. at 2.5 mm Hg., and a 166 g. fraction of the dimeric product $[(CF_3)_2CFO-CF_2CF_2-CF_2CF_2-CH_2-CH-(CH_2CH_2)_4-COOCH_3]_2$, b.p. 220°–230°C. at 2 mm Hg.

EXAMPLE XXXII

Hydrolysis of the ester $(CF_3)_2CFO-CF_2CF_2-CF_2CF_2-(CH_2CH_2)_5-COOCH_3$ (323 g.) with 32 g. of sodium hydroxide in 400 ml of aqueous alcohol on a steam bath for a period of 3 hours, followed by acidification with aqueous sulfuric acid and separation of the free acid by filtration gave a quantitative yield of the crude acid which, upon recrystallization from petroleum ether yielded 298 g. of the pure acid $(CF_3)_2CFO-CF_2CF_2-CF_2CF_2-(CH_2CH_2)_5COOH$, m.p. 54°–56°C.

While the fluorinated telomers useful as starting material for the preparation of the fluorinated compounds of the present invention may be prepared as discrete compounds, they are generally obtained as mixtures of compounds of varying chain length and corresponding varying molecular weights. It is to be understood that both, the individual discrete fluorinated telomers, as well as their mixtures of compounds of varying chain length are suitable for the preparation of the novel compounds of this invention. When employing as starting material mixtures of fluorinated telomers of varying chain length, the compounds of the present invention will, of course, be obtained as mixtures of compounds of varying chain length. If desired, individual products can be separated from such product mixtures by conventional separation techniques, as for example by fractional distillation, or by fractional crystallization using suitable inert solvents such as methylene chloride, ether, acetonitrile, carbon tetrachloride, and the like, or the product mixture may be separated into fractions of narrow ranges of molecular weights having desired properties. It is intended that the appended claims cover the individual compounds as well as mixtures thereof having varying chain length.

Further, when the telomerizable ethylenically unsaturated compounds $CZ_1Z_2=CZ_3Z_4$ and $CX_1X_2=CX_3X_4$ employed in the telomerization reaction respectively include $Z_1 - Z_4$ and/or $X_1 - X_4$ substituents of differing atomic weights, and these telomerizable ethylenically unsaturated compounds are asymmetric, then, with reference to formula II above, the telomer product will predominantly consist of telomers within the bifunctional groups $-(CZ_1Z_2-CZ_3Z_4)-$ and/or $-(CX_1X_2-CX_3X_4)-$ are arranged in the molecule so that the sums of the atomic weights of $Z_3$ and $Z_4$, and of $X_3$ and $X_4$, are greater than the sums of the atomic weights of $Z_1$ and $Z_2$, and of $X_1$ and $X_2$, respectively. In correspondingly smaller proportions of the telomer product the $Z_1-Z_{Z4}$ and $X_1-X_4$ substituents will be arranged in order reverse to that described above, or will be arranged in randomly alternating order. It is intended that the appended claims, were appropriate, cover compounds wherein in bifunctional groups $-(CZ_1Z_2-CZ_3Z_4)-$ and $-(CX_1X_2-CX_3X_4)-$ the $Z_1-Z_4$ and $X_1-X_4$ substituents are arranged in any of the above-described orders, as well as mixtures of these compounds.

Since various changes and modifications may be made in the invention without departing from the spirit and essential characteristics thereof, it is intended that all matter contained in the above description shall be interpreted as illustrative only, the invention being limited only by the scope of the appended claims.

We claim:
1. Compounds having the general formula

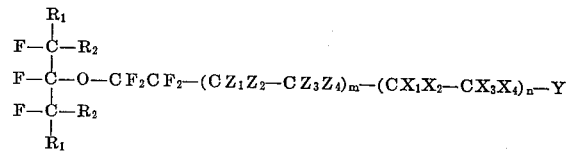

wherein
a. $R_1$ and $R_2$ are F or fluoroalkyl groups having from one to nine carbon atoms, with the proviso that not more than three of the $R_1$ and $R_2$ groups may be fluoroalkyl groups,
b. $-(CZ_1Z_2-CZ_3Z_4)-$ is a bifunctional group wherein $Z_1$, $Z_2$, $Z_3$ and $Z_4$ are independently selected from the group consisting of H, F and Cl, provided $Z_1-Z_4$ do not include more than two chlorine atoms,
c. $-(CX_1X_2-CX_3X_4)-$ is a bifunctional group wherein $X_1$, $X_2$, $X_3$ and $X_4$ are independently selected from the group consisting of H, F and Cl, provided $X_1-X_4$ do not include more than one chlorine atom,
d. Y is

wherein
i. A is selected from the group consisting of hydrogen and the alkali metals,
e. $m$ and $n$ are each integers of from 0 to about 75, with the proviso that the sum of $m$ and $n$ is from 1 to about 75.

2. Compounds according to claim 1 wherein from 1 to 3 of the $R_1$ and $R_2$ groups are perfluoroalkyl groups.

3. Compounds according to claim 1 wherein the $R_1$ and $R_2$ groups are F.

4. Compounds according to claim 3 wherein the bifunctional group $-(CZ_1Z_2-CZ_3Z_4)-$ is selected from the group consisting of $-CF_2-CF_2-$, $-CF_2-CH_2-$, $-CF_2-CFCl-$ and $-CH_2-CH_2-$.

5. Compounds according to claim 3 wherein the bifunctional group $-(CX_1X_2-CX_3X_4)-$ is selected from the group consisting of $-CF_2-CF_2-$, $-CH_2-CF_2-$ and $-CH_2-CH_2-$.

6. Compounds according to claim 5 wherein the bifunctional group $-(CZ_1Z_2-CZ_3Z_4)-$ is selected from the group consisting of $-CF_2-CF_2-$, $-CH_2-CF_2-$, $-CF_2-CFCl-$ and $-CH_2-CH_2-$.

7. Compounds according to claim 6 wherein the sum of $m$ and $n$ is from 1 to about 20.

8. Compounds according to claim 7 wherein the sum of $m$ and $n$ is from 1 to about 10.

9. Compounds according to claim 1 wherein the $R_1$ and $R_2$ groups are both F and wherein the bifunctional group $-(CZ_1Z_2-CZ_3Z_4)-$ is $-CF_2-CF_2-$.

10. Compounds according to claim 9 wherein the bifunctional group $-(CX_1X_2-CX_3X_4)-$ is $-CH_2-CH_2-$.

11. Compounds according to claim 10 wherein the sum of $m$ and $n$ is from 1 to about 20.

12. Compounds according to claim 1 wherein the $R_1$ and $R_2$ groups are both F, wherein the bifunctional group $-(CZ_1Z_2-CZ_3Z_4)-$ is $-CF_2-CF_2-$, wherein the bifunctional group $-(CX_1X_2-CX_3X_4)-$ is $-CH_2-CH_2-$, and wherein the sum of $m$ and $n$ is from 1 to about 10.

13. A compound according to claim 1 which is $(CF_3)_2CFO-CF_2CF_2-CH_2CH_2-COOH$.

14. A compound according to claim 1 which is $(CF_3)_2CFO-CF_2CF_2-CF_2CF_2-CH_2CH_2-COOH$.

15. A compound according to claim 1 which is $(CF_3)_2CFO-CF_2CF_2-(CF_2CF_2)_2-COOH$.

16. A compound according to claim 1 which is $(CF_3)_2CFO-CF_2CF_2-(CH_2CH_2)_5-COOH$.

17. A compound according to claim 1 which is $(CF_3)_2CFO-CF_2CF_2-(CH_2CH_2)_5-COONa$.

UNITED STATES PATENT OFFICE
CERTIFICATE OF CORRECTION

Patent No. 3,697,564                     Dated October 10, 1972

Inventor(s) Louis Gene Anello, Richard Francis Sweeney and Morton Herbert Litt

It is certified that error appears in the above-identified patent and that said Letters Patent are hereby corrected as shown below:

Abstract - 2nd. Formula "$-C\overset{|}{\underset{Q}{\overset{\nearrow O}{}}}$" should read -- $-C\overset{\nearrow O}{\underset{Q}{}}$ --;

Col. 2, line 18 - "formulas" should read -- formulae --;

Col. 10, line 30 - "81°-82C." should read -- 81°-82°C. --;

Col. 10, line 56 that part which reads "$-(CF_2CF_2-CN$" should read -- $-(CF_2CF_2)_2-CN$ --;

Col. 12, line 54 - "$(CF_2CF_2)B\%3$" should read -- $(CF_2CF_2)_3$ --;

Col. 12, line 57 that part which reads "$CH_2CH_2C$" should read -- $CH_2CH_2-C$ --;

Col. 14, line 47 that part which reads "$CH_2dOH$" should read -- $CH_2OH$ --;

Col. 14, line 54 that part which reads "$(CF_3)_2CRO$" should read -- $(CF_3)_2CFO$ --;

Col. 15, line 2 that part which reads "$CH_2dOH$" should read -- $CH_2OH$ --;

Col. 15, line 9 that part which reads "$CH_2dCl$" should read -- $CH_2Cl$ --;

UNITED STATES PATENT OFFICE
CERTIFICATE OF CORRECTION

Patent No. 3,697,564  Dated October 10, 1972

Inventor(s) Louis Gene Anello et al    Page - 2

It is certified that error appears in the above-identified patent and that said Letters Patent are hereby corrected as shown below:

Col. 15, line 13 that part which reads "$(CH_2)_6cCl$" should read -- $(CH_2)_6Cl$ --;

Col. 15, line 15 that part which reads "$(CH_2)_6cOH$" should read $(CH_2)_6OH$ --;

Col. 15, line 27 "hour constant" should read -- hour with constant --;

Col. 15, line 38 that part which reads "$CH_2dCl$" should read -- $CH_2Cl$ --;

Col. 15, line 47 that part which reads "$CH_2dCl$" should read -- $CH_2Cl$ --;

Col. 15, line 51 that part which reads "OH contents" should read -- OH --;

Col. 16, line 48 that part which reads "$(CH_2CH_2)-ClCl$" should read -- $(CH_2CH_2)_5-COCl$ --;

Col. 17, first table - "WAter" should read -- Water --;

Col. 18, line 31 "iodester" should read -- iodoester --;

UNITED STATES PATENT OFFICE
CERTIFICATE OF CORRECTION

Patent No. 3,697,564  Dated October 10, 1972

Inventor(s) Louis Gene Anello et al   Page - 3

It is certified that error appears in the above-identified patent and that said Letters Patent are hereby corrected as shown below:

Col. 19, line 31 "$Z_1-Z_z4$" should read -- $Z_1-Z_4$ --;

Col. 20, line 15 "1. A is" should read -- A is --.

Signed and sealed this 5th day of November 1974.

(SEAL)
Attest:

McCOY M. GIBSON, JR.
Attesting Officer

C. MARSHALL DANN
Commissioner of Patents